US011215266B2

(12) United States Patent
Matsuto et al.

(10) Patent No.: US 11,215,266 B2
(45) Date of Patent: Jan. 4, 2022

(54) ELECTRIC ACTUATOR (71) Applicant: NTN CORPORATION, Osaka (JP)

(72) Inventors: Takushi Matsuto, Shizuoka (JP);
Shinsuke Hirano, Shizuoka (JP);
Atsushi Ikeda, Shizuoka (JP); Tomomi Ishikawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 230 days.

(21) Appl. No.: 16/082,963

(22) PCT Filed: Mar. 22, 2017

(86) PCT No.: PCT/JP2017/011441
§ 371 (c)(1),
(2) Date: Sep. 7, 2018

(87) PCT Pub. No.: WO2017/170035
PCT Pub. Date: Oct. 5, 2017

(65) Prior Publication Data
US 2019/0092399 A1 Mar. 28, 2019

(30) Foreign Application Priority Data
Mar. 30, 2016 (JP) .............................. JP2016-069065

(51) Int. Cl.
*F16H 25/22* (2006.01)
*F16H 25/20* (2006.01)
(Continued)

(52) U.S. Cl.
CPC ............. *F16H 25/22* (2013.01); *F16H 25/20* (2013.01); *B62D 5/0448* (2013.01); *B62D 33/07* (2013.01);
(Continued)

(58) Field of Classification Search
CPC .... B62D 33/07; B62D 5/0448; B62D 5/0445; F16C 19/185; F16H 25/20; F16H 25/22;
(Continued)

(56) References Cited
U.S. PATENT DOCUMENTS 2,949,036 A * 8/1960 Ellis ........................ F16H 25/20
74/89.35
3,216,264 A * 11/1965 Lloyd .................. F16H 25/2418
74/18.2
(Continued)

FOREIGN PATENT DOCUMENTS

DE 102006009829 A1 * 9/2006 .......... F15B 15/2861
FR 2 856 452 12/2004
(Continued)

OTHER PUBLICATIONS

Extended European Search Report dated Oct. 30, 2019 in corresponding European Patent Application No. 17774576.7.
(Continued)

*Primary Examiner* — Jake Cook
*Assistant Examiner* — T. Scott Fix
(74) *Attorney, Agent, or Firm* — Wenderoth, Lind & Ponack, L.L.P.

(57) ABSTRACT

An electric actuator includes: a drive part (2); a motion conversion mechanism part (3) configured to convert a rotary motion from the drive part (2) to a linear motion in an axial direction parallel with an output shaft (10a) of the drive part (2); a driving force transmission part (4) including a transmission gear mechanism (28) configured to transmit a driving force from the drive part (2) to the motion conversion mechanism part (3); and a motion-conversion-mechanism support part (5) including a double-row bearing (40) configured to support the motion conversion mechanism part (3), wherein the double-row bearing (40) is arranged on one
(Continued)

side in the axial direction with respect to the transmission gear mechanism (28).

5 Claims, 10 Drawing Sheets (51) Int. Cl.
  B62D 5/04    (2006.01)
  B62D 33/07   (2006.01)
  F16C 19/18   (2006.01)
  F16H 25/24   (2006.01)

(52) U.S. Cl.
  CPC ........ F16C 19/185 (2013.01); F16H 25/2454 (2013.01)

(58) Field of Classification Search
  CPC ............. F16H 25/2454; F16H 25/2015; F16H 25/2204; F16H 2025/2081; F16H 2025/2087; F16H 25/24; F16H 25/2418; F16H 2025/2031; F16H 2710/22; H02K 7/06
  USPC ......................................... 74/89.34, 18, 18.2
  See application file for complete search history.

(56) References Cited

U.S. PATENT DOCUMENTS

| | | | | |
|---|---|---|---|---|
| 3,382,954 A * | 5/1968 | Charlson | .................. | B64F 1/02 188/322.16 |
| 3,517,781 A * | 6/1970 | Weerd | .................. | F16F 9/0481 188/284 |
| 3,532,001 A * | 10/1970 | Dunn | .................. | F16J 15/50 74/18.2 |
| 3,742,772 A * | 7/1973 | Makovec | .................. | F16J 15/52 74/18.2 |
| 4,535,998 A * | 8/1985 | Katz | .................. | F16J 15/3268 188/322.17 |
| 4,537,289 A * | 8/1985 | VonGrunberg | ..... | F16D 65/0979 188/264 G |
| 4,709,789 A * | 12/1987 | Czich | ................ | F16D 55/22655 188/73.44 |
| 4,747,319 A * | 5/1988 | Sakuta | .................. | B62D 33/07 74/411.5 |
| 4,754,854 A * | 7/1988 | Adachi | ............. | F16D 55/22655 137/154 |
| 4,777,361 A * | 10/1988 | Affa | .................. | G01D 5/34738 250/237 G |
| 4,916,423 A * | 4/1990 | Sugiyama | ................ | F02N 15/00 277/635 |
| 5,029,401 A * | 7/1991 | Masom | .................... | F16J 15/52 33/705 |
| 5,231,352 A * | 7/1993 | Huber | .................... | G01D 5/145 324/207.13 |
| 7,202,658 B2 * | 4/2007 | Ketelaars | .................. | G01P 3/66 324/174 |
| 7,537,080 B2 * | 5/2009 | Murakami | ........... | B62D 5/0424 180/444 |
| 8,141,445 B2 * | 3/2012 | Yoshioka | .............. | F16C 35/063 29/505 |
| 2003/0000766 A1 * | 1/2003 | Tatewaki | ............. | B62D 5/0448 180/444 |
| 2005/0150873 A1 * | 7/2005 | Schmitt-Walter | .... | B23K 11/314 219/86.32 |
| 2006/0213298 A1 * | 9/2006 | Tateishi | ............... | F16H 25/2204 74/89.23 |
| 2007/0151794 A1 * | 7/2007 | Mizutani | .............. | B62D 5/0448 180/444 |
| 2011/0271793 A1 * | 11/2011 | Hatano | ............... | F15B 15/1457 74/608 |
| 2012/0186896 A1 * | 7/2012 | Yamamoto | ........... | B62D 5/0448 180/444 |
| 2012/0247240 A1 * | 10/2012 | Kawahara | ............... | F16H 25/20 74/89.23 |
| 2013/0112022 A1 * | 5/2013 | Shimizu | ............... | H02K 11/215 74/89.34 |
| 2013/0118827 A1 * | 5/2013 | Imanishi | ............... | B62D 5/0448 180/443 |
| 2013/0249335 A1 * | 9/2013 | Motoda | .............. | H02K 11/0094 310/71 |
| 2014/0008905 A1 * | 1/2014 | Rudy | ..................... | B66C 23/78 280/766.1 |
| 2014/0157918 A1 * | 6/2014 | Ikeda | .................. | F16H 25/2204 74/89.23 |
| 2014/0238168 A1 * | 8/2014 | Ikeda | ....................... | F16H 25/20 74/89.23 |
| 2014/0245848 A1 * | 9/2014 | Ikeda | .................. | F16H 25/2204 74/89.44 |
| 2014/0291062 A1 | 10/2014 | Tojo | | |
| 2014/0345966 A1 | 11/2014 | Asakura et al. | | |
| 2014/0352466 A1 * | 12/2014 | Ikeda | .................. | F16H 25/2214 74/89.23 |
| 2015/0101428 A1 * | 4/2015 | Mizuuchi | .............. | F16H 57/029 74/89.23 |
| 2015/0211624 A1 * | 7/2015 | Pasaribu | ............. | F16C 33/6633 74/416 |
| 2015/0240922 A1 * | 8/2015 | Parker | ..................... | F16H 25/24 74/89.37 |
| 2016/0195115 A1 * | 7/2016 | Fenn | ....................... | F16H 25/20 92/82 |
| 2016/0319922 A1 * | 11/2016 | Fukunaga | ............. | F16C 33/723 |
| 2017/0050669 A1 * | 2/2017 | Asakura | ............... | B62D 5/0481 |
| 2017/0088251 A1 * | 3/2017 | Nfonguem | .............. | B64C 13/40 |
| 2017/0089435 A1 * | 3/2017 | Tsai | ....................... | F16H 25/20 |
| 2017/0145727 A1 * | 5/2017 | Yamagata | ............. | E05F 15/622 |
| 2017/0291590 A1 * | 10/2017 | Shigeta | ..................... | F15B 7/08 |
| 2017/0350479 A1 * | 12/2017 | Shimizu | .................. | B25B 27/20 |
| 2018/0313438 A1 * | 11/2018 | Yamasaki | ............. | F16D 65/183 |
| 2019/0264789 A1 * | 8/2019 | Shimizu | .................. | F16C 19/18 |

FOREIGN PATENT DOCUMENTS

| | | |
|---|---|---|
| JP | 62-270861 | 11/1987 |
| JP | 2008-95913 | 4/2008 |
| JP | 2008-116037 | 5/2008 |
| JP | 2009-44888 | 2/2009 |
| JP | 5243018 | 7/2013 |
| JP | 2014-189060 | 10/2014 |
| JP | 2014-227048 | 12/2014 |
| JP | 2015-89694 | 5/2015 |
| JP | 2015-89717 | 5/2015 |
| JP | 2015-174481 | 10/2015 |
| JP | 2015-178329 | 10/2015 |
| JP | 2016-30479 | 3/2016 |
| WO | WO-2007064271 A1 * | 6/2007 ............ G01D 5/145 |

OTHER PUBLICATIONS

International Preliminary Report on Patentability dated Oct. 2, 2018 in International (PCT) Application No. PCT/JP2017/011441.
International Search Report dated Jun. 20, 2017 in International (PCT) Application No. PCT/JP2017/011441.
Notice of Reasons for Refusal dated Jun. 17, 2020 in corresponding Japanese Patent Application No. 2016-069065, with Machine Translation.

* cited by examiner

ELECTRIC ACTUATOR

TECHNICAL FIELD

The present invention relates to an electric actuator.

BACKGROUND ART

In recent years, electrification of automobiles and the like has been promoted for power saving and reduction in fuel consumption. For example, a system for operating an automatic transmission, a brake, a steering wheel, and the like of the automobile with use of power of an electric motor has been developed and brought to the market. As an electric actuator for use in such an application, there has been known an electric linear actuator employing a ball screw mechanism configured to convert a rotary motion of a motor into a motion in a linear direction.

Figure 13:
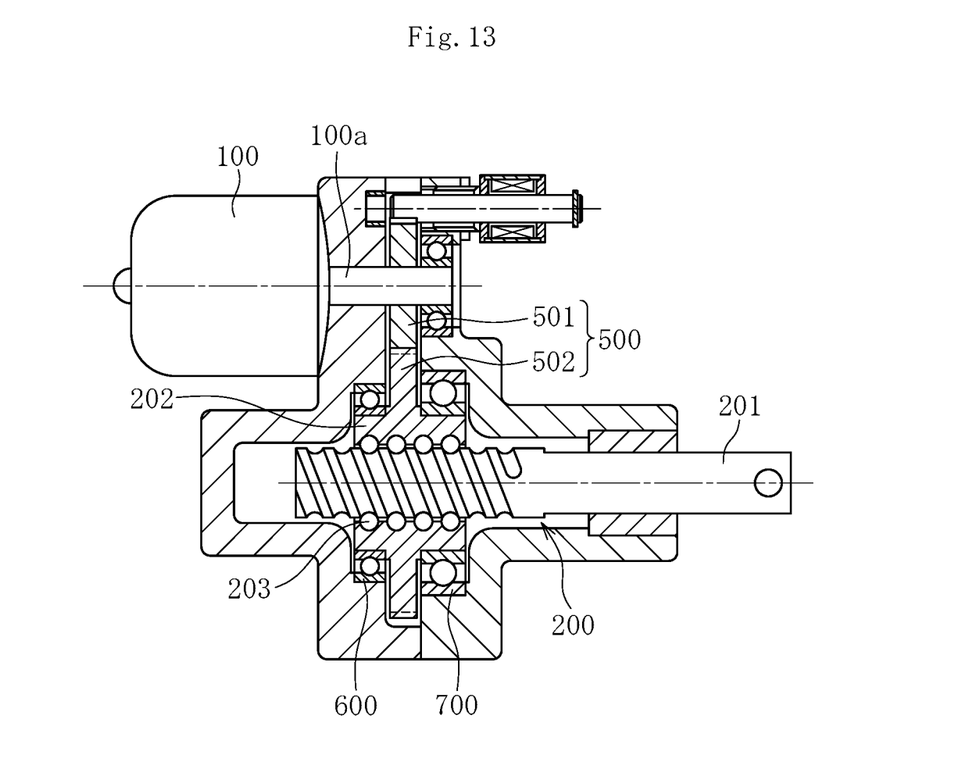
FIG. 13 is a vertical sectional view of a related-art electric linear actuator.

For example, as illustrated in FIG. 13, in Patent Literature 1, there is disclosed an electric linear actuator mainly including an electric motor 100, a ball screw 200, and a gear speed reduction mechanism 500. The gear speed reduction mechanism 500 is configured to transmit a rotary motion of the electric motor 100 to the ball screw 200. The ball screw 200 includes a screw shaft 201, a nut 202, and a large number of balls 203. The screw shaft 201 has a spiral screw groove formed in an outer peripheral surface. The nut 202 is externally fitted to the screw shaft 201, and has a spiral screw groove formed in an inner peripheral surface. The balls 203 are received in both of the screw grooves. The gear speed reduction mechanism 500 includes a first gear 501 and a second gear 502. The first gear 501 has a small diameter, and is fixed to a motor shaft 100a of the electric motor 100. The second gear 502 has a large diameter, is formed on an outer periphery of the nut 202, and meshes with the first gear 501. When a driving force of the electric motor 100 is transmitted to the nut 202 thorough intermediation of the gears 501 and 502, the nut 202 rotates, and the screw shaft 201 performs a linear motion.

CITATION LIST

Patent Literature 1: JP 5243018 B2

SUMMARY OF INVENTION

Technical Problem

Incidentally, in the electric linear actuator disclosed in Patent Literature 1, in order to support the nut 202, two rolling bearings 600 and 700 are arranged on both sides of the nut 202 while sandwiching the second gear 502. However, in the case in which the rolling bearings 600 and 700 are arranged at such positions, when other component parts are to be arranged around the ball screw 200, such a restriction in terms of layout that interference with the respective rolling bearing 600 and 700 needs to be prevented on the both sides of the second gear 502 is imposed, which may pose a problem in size reduction or design change.

The present invention has been made in view of the above-mentioned problem, and therefore has an object to provide an electric actuator capable of achieving size reduction and increase in degree of freedom in design.

Solution to Problem

As a technical measure to attain the above-mentioned object, according to one embodiment of the present invention, there is provided an electric actuator, comprising: a drive part; a motion conversion mechanism part configured to convert a rotary motion from the drive part to a linear motion in an axial direction parallel with an output shaft of the drive part; a driving force transmission part comprising a transmission gear mechanism configured to transmit a driving force from the drive part to the motion conversion mechanism part; and a motion-conversion-mechanism support part comprising a double-row bearing configured to support the motion conversion mechanism part, wherein the double-row bearing is arranged on one side in the axial direction with respect to the transmission gear mechanism.

Through the arrangement of the double-row bearing on the one side with respect to the transmission gear mechanism in the axial direction in such a manner, there is no need to consider interference between the double-row bearing and other component parts on the side on which the double-row bearing is not arranged. Accordingly, the degree of freedom in design of the component layout thus increases, and the downsizing can also be attained.

Further, the double-row bearing is arranged on the opposite side of the drive part with respect to the transmission gear mechanism. Thus, the drive part can be arranged close to the motion conversion mechanism part in a direction orthogonal to the axial direction thereof on the side on which the double-row bearing is not arranged. With this, an axis-to-axis distance between the drive part and the motion conversion mechanism part can be reduced, and downsizing of the electric actuator can thus be attained.

It is desired that the double-row bearing comprise a double-row angular contact ball bearing. In this case, the double-row bearing can bear a radial load as well as axial loads in both directions, and can thus stably and reliably support the motion conversion mechanism part.

Further, it is desired that the double-row angular contact ball bearing have a back-to-back configuration. This case is advantageous also with respect to a moment load.

Moreover, the electric actuator may comprise a stroke sensor configured to detect a stroke of the linear motion of the motion conversion mechanism part. In this case, the stroke sensor can be arranged on the opposite side of the double-row bearing with respect to the transmission gear mechanism, and the stroke sensor can thus be arranged without considering interference with the double-row bearing.

Moreover, the electric actuator may comprise a boot configured to prevent a foreign substance from entering the motion conversion mechanism part. In this case, the boot can be arranged on the opposite side of the double-row bearing with respect to the transmission gear mechanism, and the boot can thus be arranged without considering interference with the double-row bearing.

The drive part may comprise a driving motor and a motor case configured to accommodate the driving motor. In this case, an outer peripheral surface of the motor case on a side of the motion conversion mechanism part is arranged at a position closer to the motion conversion mechanism part than a position of an imaginary plane of an extension in the axial direction of an outer peripheral surface of the double-row bearing. Thus, an axis-to-axis distance between the driving motor and the motion conversion mechanism part can be reduced, and downsizing of the electric actuator can thus be attained.

Advantageous Effects of Invention

According to one embodiment of the present invention, the electric actuator capable of achieving the size reduction and the increase in degree of freedom in design can be provided.

DESCRIPTION OF EMBODIMENTS

Now, description is made of the present invention with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
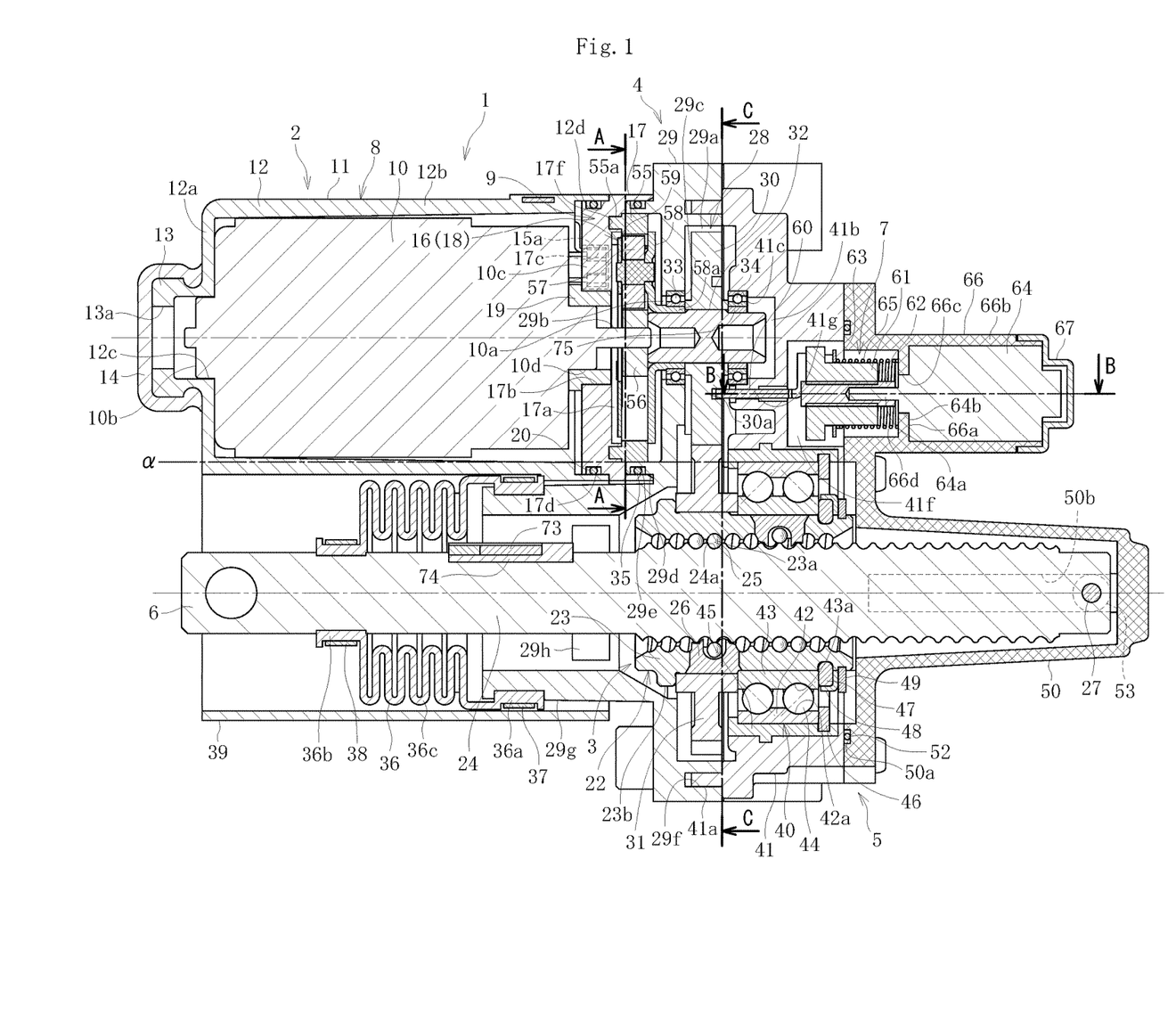
FIG. 1 is a vertical sectional view of an electric actuator according to one embodiment of the present invention.
Figure 2:
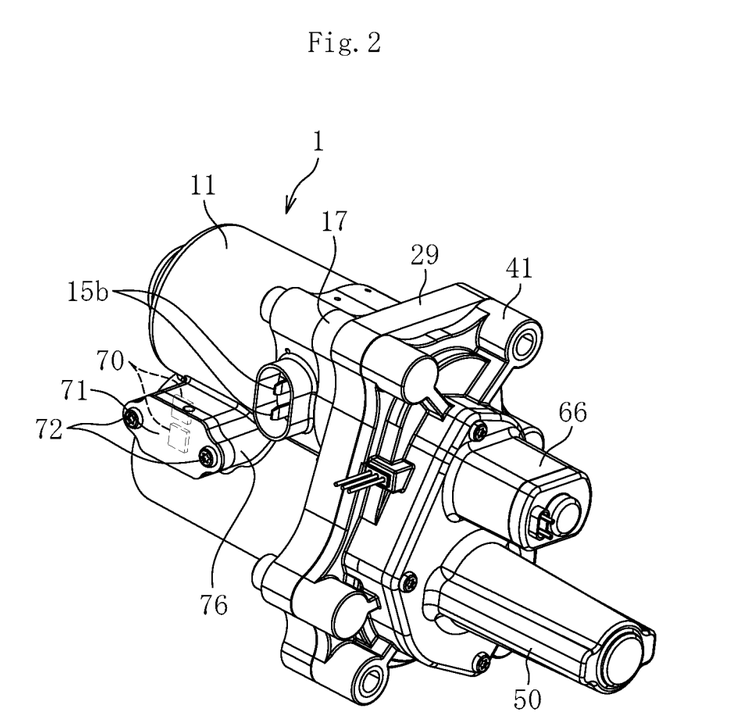
FIG. 2 is an external perspective view of the electric actuator.
Figure 3:
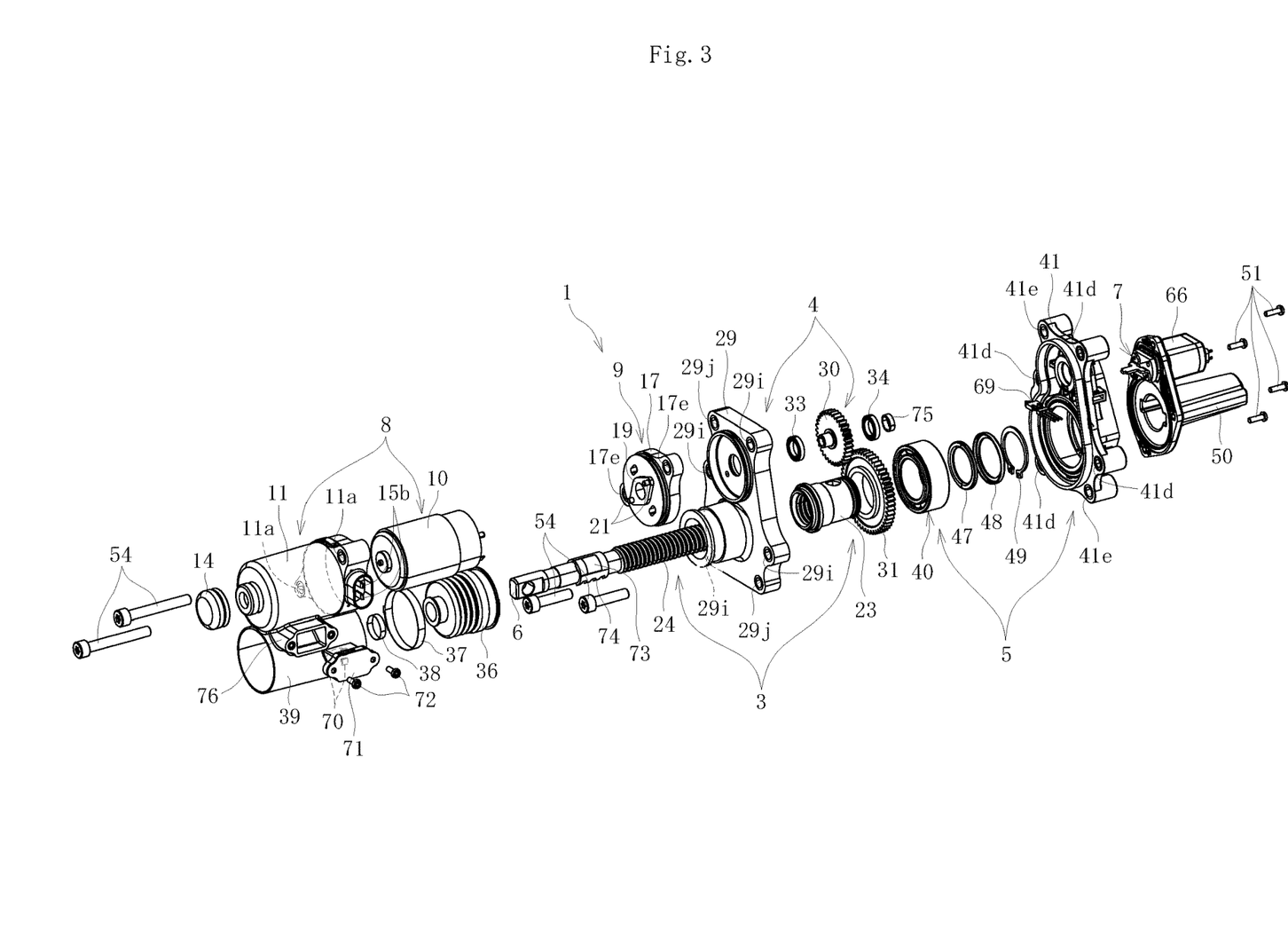
FIG. 3 is an exploded perspective view of the electric actuator.

FIG. 1 is a vertical sectional view for illustrating an assembled state of an electric actuator according to one embodiment of the present invention. FIG. 2 is an external perspective view for illustrating the assembled state of the electric actuator. FIG. 3 is an exploded perspective view of the electric actuator.

As illustrated in FIG. 1, an electric actuator 1 of this embodiment mainly comprises a drive part 2, a motion conversion mechanism part 3, a driving force transmission part 4, a motion-conversion-mechanism support part 5, an operation part 6, and a lock mechanism part 7. The drive part 2 is configured to generate a driving force. The motion conversion mechanism part 3 is configured to convert a rotary motion from the drive part 2 into a linear motion. The driving force transmission part 4 is configured to transmit the driving force from the drive part 2 to the motion conversion mechanism part 3. The motion-conversion-mechanism support part 5 is configured to support the motion conversion mechanism part 3. The operation part 6 is configured to output the motion of the motion conversion mechanism part 3. The lock mechanism part 7 is configured to prevent the motion conversion mechanism part 3 from driving. Moreover, the drive part 2 comprises a motor part 8 and a speed reduction mechanism part 9.

Each of the parts forming the electric actuator 1 has a case. Component parts are accommodated in each of the cases. Specifically, the motor part 8 comprises a motor case 11 configured to accommodate a driving motor 10. The speed reduction mechanism part 9 comprises a speed reduction gear case 17 configured to accommodate a speed reduction gear mechanism 16. Moreover, the driving force transmission part 4 comprises a transmission gear case 29 configured to accommodate a transmission gear mechanism 28. The motion-conversion-mechanism support part 5 comprises a bearing case 41 configured to accommodate a support bearing 40. Further, respective pairs of the motor part 8 and the speed reduction mechanism part 9, the speed reduction mechanism part 9 and the driving force transmission part 4, and the driving force transmission part 4 and the motion-conversion-mechanism support part 5 are configured to be capable of being coupled to and decoupled from one another while the pairs are accommodated in the cases. Further, a shaft case 50 is configured to be capable of being coupled to and decoupled from the bearing case 41. Now, description is made of detailed configurations of the respective parts forming the electric actuator 1.

The motor part 8 mainly comprises the driving motor (DC motor) 10 and the motor case 11. The driving motor 10 is configured to drive the motion conversion mechanism part 3. The motor case 11 is configured to accommodate the driving motor 10. The motor case 11 comprises a case main body 12 and a projecting portion 13. The case main body 12 has a bottomed cylindrical shape, and is configured to accommodate the driving motor 10 therein. The projecting portion 13 projects from a bottom portion 12a of the case main body 12 to the outside. The projecting portion 13 has a hole portion 13a which communicates to an internal space of the case main body 12. The hole portion 13a is sealed by a seal member 14 that is made of resin and covers an outer surface of the projecting portion 13.

Under a state in which the driving motor 10 is inserted from an opening portion 12d of the case main body 12 into an inside of the case main body 12, an end surface of the driving motor 10 on an inner side in an insertion direction is held in abutment against the bottom portion 12a of the case main body 12. Moreover, a fitting hole 12c is formed in a center portion of the bottom portion 12a. A projection 10b of the driving motor 10 in the inner side in the insertion direction is fitted to the fitting hole 12c, thereby preventing interference of a rear end (left end portion in FIG. 1) of an output shaft 10a projecting from the projection 10b with the bottom portion 12a of the motor case 11. Further, an inner peripheral surface of a peripheral wall portion 12b of the case main body 12 is reduced in diameter in a tapered shape from the opening portion 12d side toward the bottom portion 12a side. When the driving motor 10 is inserted into the case main body 12, an outer peripheral surface of the driving motor 10 on the inner side in the insertion direction comes into contact with the inner peripheral surface of the peripheral wall portion 12b. With this configuration, the driving motor 10 is supported through the contact with the inner peripheral surface of the case main body 12 and the fitting to the fitting hole 12c under the state in which the driving motor 10 is inserted into the case main body 12.

Figure 4:
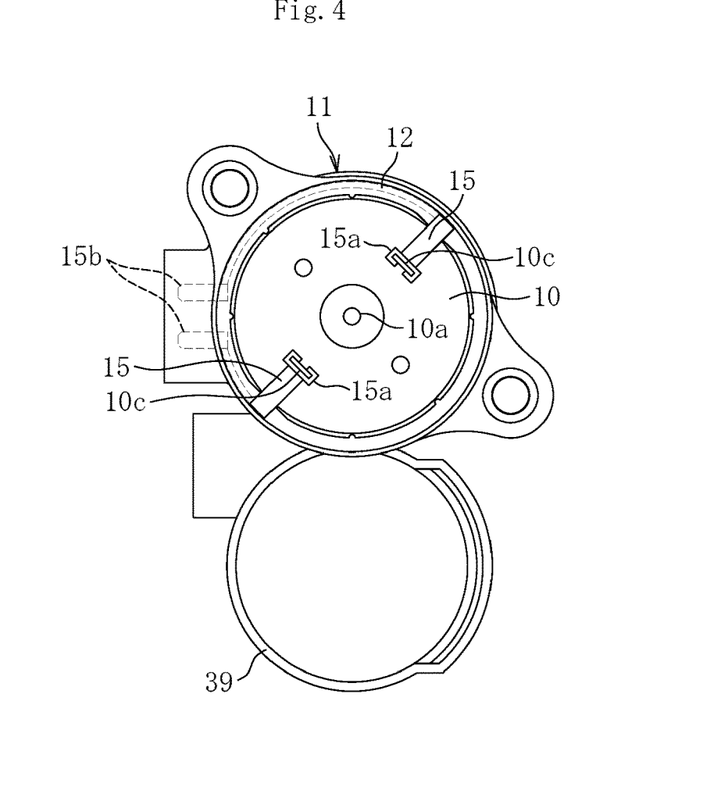
FIG. 4 is a view of a motor case as seen from an opening portion side.

Moreover, as illustrated in FIG. 4, which is a view of the motor case 11 as seen from the opening portion 12d side, a pair of bus bars 15 configured to connect the driving motor 10 to a power supply is mounted to the case main body 12. One end portion 15a of each of the bus bars 15 is connected to a motor terminal 10c through crimping, and another end portion 15b is exposed from the case main body 12 to the outside (see FIG. 2 and FIG. 3). The end portions 15b of the bus bars 15 exposed to the outside are connected to the power supply.

Next, description is made of the speed reduction mechanism part 9.

As illustrated in FIG. 1, the speed reduction mechanism part 9 mainly comprises the speed reduction gear mechanism 16 and the speed reduction gear case 17. The speed reduction gear mechanism 16 is configured to reduce the speed of the driving force of the driving motor 10 and output the driving force. The speed reduction gear case 17 is configured to accommodate the speed reduction gear mechanism 16. The speed reduction gear mechanism 16 is formed of a planetary-gear speed reduction mechanism 18 comprising a plurality of gears and the like. A detailed configuration of the planetary-gear speed reduction mechanism 18 is described later.

The speed reduction gear case 17 has an accommodating recessed portion 17a configured to accommodate the planetary-gear speed reduction mechanism 18 from an opposite side of the driving motor 10. Moreover, the speed reduction gear case 17 is formed so as to enable a motor adaptor 19 serving as a motor mounting member to be mounted thereto. The motor adaptor 19 is a tubular member, and a projection 10d of the driving motor 10 on an output side (right side in FIG. 1) is inserted into and fitted to an inner peripheral surface of the motor adaptor 19. The speed reduction gear case 17 has a fitting hole 17b to which the motor adaptor 19 is fitted. The motor adaptor 19 is inserted from the driving motor 10 side into the fitting hole 17b and mounted to the fitting hole 17b.

The speed reduction gear case 17 is configured to be capable of being fitted to the motor case 11 and the transmission gear case 29 described later and arranged on the opposite side of the motor case 11. A portion of the speed reduction gear case 17 arranged on the motor case 11 side is internally fitted to the opening portion 12d side of the motor case 11. A portion of the speed reduction gear case 17 arranged on the transmission gear case 29 side is externally fitted to the transmission gear case 29. Moreover, the speed reduction gear case 17 is fastened to the driving motor 10 through bolts 21 (see FIG. 3 and FIG. 6) together with the motor adaptor 19 while being fitted to the motor case 11. On the driving motor 10 side of the speed reduction gear case 17, there are formed recessed portions 17c configured to prevent interference with the motor terminals 10c projecting from the driving motor 10 and with the end portions 15a of the bus bars 15 crimped to the motor terminals 10c while the speed reduction gear case 17 and the motor case 11 are fitted to each other. Moreover, a mounting groove 17d configured to mount an O ring 20 is formed in an outer peripheral surface (fitting surface) of the speed reduction gear case 17 to be fitted to an inner peripheral surface of the motor case 11.

Next, description is made of the motion conversion mechanism part 3.

The motion conversion mechanism part 3 is formed of a ball screw 22. The ball screw 22 mainly comprises a ball screw nut 23, a ball screw shaft 24, a large number of balls 25, and deflectors 26. The ball screw nut 23 serves as a rotary body. The ball screw shaft 24 is a shaft portion performing a linear motion. The deflectors 26 serve as circulation members. Spiral grooves 23a and 24a are respectively formed in an inner peripheral surface of the ball screw nut 23 and an outer peripheral surface of the ball screw shaft 24. The balls 25 are loaded between both of the spiral grooves 23a and 24a, and the deflectors 26 are assembled therebetween. With this configuration, the balls 25 in two rows circulate.

The ball screw nut 23 receives the driving force from the driving motor 10, to thereby rotate in a forward direction or a backward direction. Meanwhile, the rotation of the ball screw shaft 24 is restricted by a pin 27 that is provided on a rear end portion (right end portion in FIG. 1) thereof and serves as a rotation restriction member. Therefore, when the ball screw nut 23 rotates, the balls 25 circulate along both the spiral grooves 23a and 24a and the deflectors 26, and the ball screw shaft 24 advances and retreats in the axial direction. FIG. 1 is a view for illustrating a state in which the ball screw shaft 24 is arranged at an initial position given when the ball screw shaft 24 retreats most to the right side of FIG. 1. Moreover, the ball screw shaft 24 is arranged in parallel with the output shaft 10a of the driving motor 10. The rotary motion from the driving motor 10 is converted into a linear motion in the axial direction parallel with the output shaft 10a by the ball screw shaft 24. A distal end portion (left end portion in FIG. 1) of the ball screw shaft 24 in an advancing direction functions as the operation part (actuator head) 6 configured to operate an object device to be operated Next, description is made of the driving force transmission part 4.

The driving force transmission part 4 mainly comprises the transmission gear mechanism 28 and the transmission gear case 29. The transmission gear mechanism 28 is configured to transmit the driving force from the driving motor 10 of the drive part 2 to the ball screw 22 being the motion conversion mechanism part 3. The transmission gear case 29 is configured to accommodate the transmission gear mechanism 28. The transmission gear mechanism 28 comprises a drive gear 30 on a drive side and a driven gear 31 on a driven side meshing with the drive gear 30.

A gear boss 32 is press-fitted to a rotation center portion of the drive gear 30. The drive gear 30 is rotatably supported through intermediation of the gear boss 32 by two rolling bearings 33 and 34 mounted to both the transmission gear case 29 and the bearing case 41 described later. Meanwhile, the driven gear 31 is press-fitted and fixed to the outer peripheral surface of the ball screw nut 23. When the driving force from the driving motor 10 is transmitted to the drive gear 30 through intermediation of the planetary-gear speed reduction mechanism 18, the driven gear 31 and the ball screw nut 23 integrally rotate, and the ball screw shaft 24 advances and retreats.

The transmission gear case 29 comprises an accommodating recessed portion 29a configured to accommodate the drive gear 30 and the driven gear 31 therein. Moreover, the transmission gear case 29 has an insertion hole 29b through which the gear boss 32 is inserted. On an inner peripheral surface of the insertion hole 29b, there is formed a bearing mounting surface 29c to which the one rolling bearing 33 configured to support the gear boss 32 is mounted. Moreover, the transmission gear case 29 comprises an annular projection 29d fitted to an inner peripheral surface of the speed reduction gear case 17. In an outer peripheral surface (fitting surface) of the annular projection 29d, there is formed a mounting groove 29e configured to mount an O ring 35. Moreover, in a surface of the transmission gear case 29 on the bearing case 41 side, there is formed a fitting recessed portion 29f in a groove form fitted to the bearing case 41.

Moreover, the transmission gear case 29 comprises a cylindrical portion 29g projecting toward a distal end portion side (left side in FIG. 1) of the ball screw shaft 24. The cylindrical portion 29g is a portion arranged so as to cover a periphery of the ball screw shaft 24 under a state in which the driven gear 31 is accommodated in the transmission gear case 29, and the ball screw 22 is assembled to the driven gear 31. A boot 36 configured to prevent foreign substances from entering the transmission gear case 29 is mounted between the cylindrical portion 29g and the ball screw shaft 24. The boot 36 comprises a large-diameter end portion 36a, a small-diameter end portion 36b, and a bellows portion 36c, which connects the large-diameter end portion 36a and the small-diameter end portion 36b to each other, and expands and contracts in the axial direction. The large-diameter end portion 36a is fixed to a mounting portion of an outer peripheral surface of the cylindrical portion 29g by tightening a boot band 37. The small-diameter end portion 36b is fixed to a mounting portion of the outer peripheral surface of the ball screw shaft 24 by tightening a boot band 38. Moreover, the cylindrical portion 29g has a vent hole 29h which is configured to cause the air to communicate between an inside and an outside of the boot 36 when the boot 36 expands and contracts. Moreover, a boot cover 39 arranged around the boot 36 is provided integrally with the motor case 11.

Next, description is made of the motion-conversion-mechanism support part 5.

The motion-conversion-mechanism support part 5 mainly comprises the support bearing 40 and the bearing case 41. The support bearing 40 is configured to support the ball screw 22 being the motion conversion mechanism part 3. The support bearing 40 is formed of a double-row angular contact ball bearing mainly comprising an outer ring 42, an inner ring 43, double-row balls 44, and a retainer (not shown). The outer ring 42 has double-row raceway surfaces 42a formed on an inner peripheral surface. The inner ring 43 has double-row raceway surfaces 43a formed on an outer peripheral surface. The balls 44 are interposed between the raceway surfaces 42a and 43a. The retainer is configured to retain the balls 44.

The support bearing 40 is accommodated in a sleeve 45 formed integrally with the bearing case 41, and is fixed through a snap ring 46 mounted to an inner peripheral surface of the sleeve 45. Moreover, the support bearing 40 is fixed by being press-fitted to an outer peripheral surface of the ball screw nut 23 on a rear end side (right side in FIG. 1) of the ball screw shaft 24 with respect to the driven gear 31. A movement in the axial direction of the support bearing 40 and the driven gear 31 fixed to the outer peripheral surface of the ball screw nut 23 is restricted by a restriction projection 23b formed on the ball screw nut 23 on the driven gear 31 side and a restriction member 47 mounted on the support bearing 40 side. The restriction member 47 comprises a pair of semicircular members, and is mounted to the outer peripheral surface of the ball screw nut 23 while the semicircular members are combined in an annular form. Further, a pressing collar 48 and a snap ring 49 are mounted to the outer peripheral surface of the ball screw nut 23. The pressing collar 48 is configured to hold the restriction member 47. The snap ring 49 is configured to prevent the pressing collar 48 from falling off in the axial direction.

On the transmission gear case 29 side of the bearing case 41, there is formed a protruding portion 41a configured to be fitted to the fitting recessed portion 29f of the transmission gear case 29. Moreover, on the transmission gear case 29 side of the bearing case 41, there is formed a gear boss accommodating portion 41b configured to accommodate a part of the gear boss 32 projecting from the transmission gear case 29 under a state in which the bearing case 41 is fitted to the transmission gear case 29. On an inner peripheral surface of the gear boss accommodating portion 41b, there is formed a bearing mounting surface 41c which is configured to mount the rolling bearing 34 configured to support the gear boss 32.

On an opposite side of the bearing case 41 with respect to the transmission gear case 29 side, the shaft case 50 having a bottomed tubular shape configured to accommodate a rear end portion side (right end portion side in FIG. 1) of the ball screw shaft 24 is formed so as to be capable of being fastened through bolts 51 (see FIG. 3). In an abutment surface of the shaft case 50 against the bearing case 41, there is formed a mounting groove 50a configured to mount an O ring 52. Moreover, in an inner peripheral surface of the shaft case 50, guide grooves 50b into which both end portions of the pin 27 provided on the ball screw shaft 24 are formed so as to extend in the axial direction. A guide collar 53 is rotatably mounted to each of the both end portions of the pin 27. When the ball screw shaft 24 advances and retreats in the axial direction, the guide collars 53 move along the guide grooves 50b while rotating.

As illustrated in FIG. 3, bolt insertion holes 11a, 17e, 29i, and 41d for inserting bolts 54 configured to assemble and fasten the motor case 11, the speed reduction gear case 17, the transmission gear case 29, and the bearing case 41 are formed in outer peripheries of the respective cases in a radial direction. Further, through holes 29j and 41e configured to mount the assembled electric actuator 1 to an installation location are formed in the outer peripheries in the radial direction of both of the transmission gear case 29 and the bearing case 41.

Figure 5:
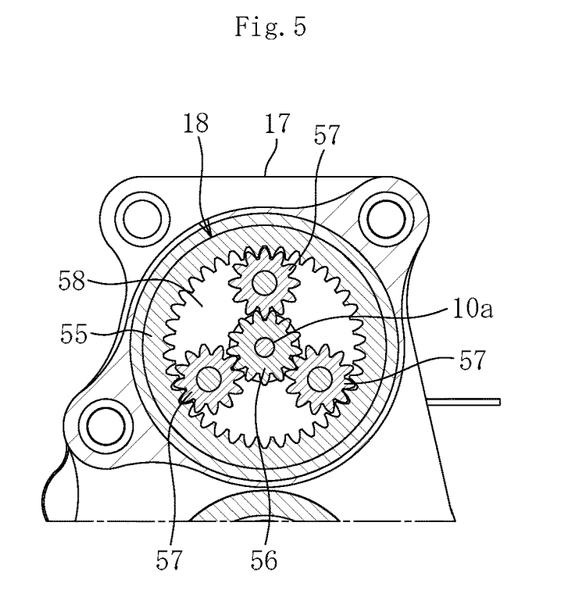
FIG. 5 is a transverse sectional view as seen in a direction indicated by the arrows of the line A-A in FIG. 1.
Figure 6:
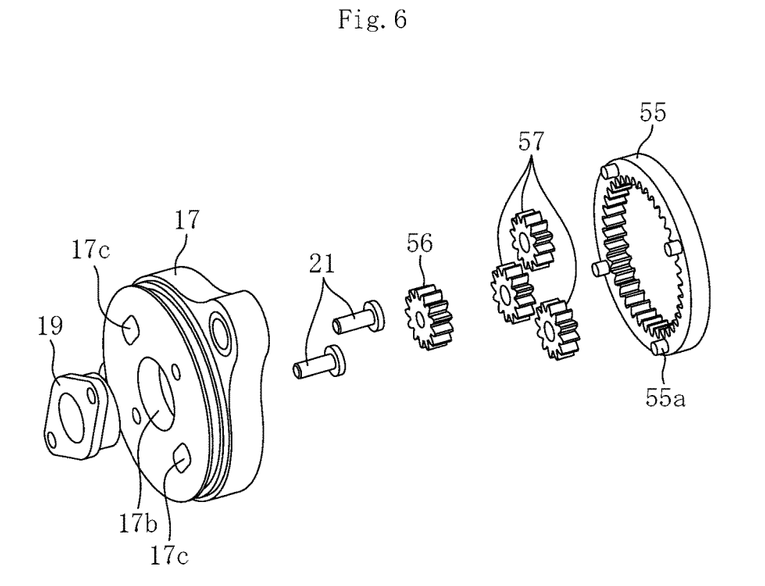
FIG. 6 is an exploded perspective view of a speed reduction mechanism part.

Now, description is made of the planetary-gear speed reduction mechanism 18 with reference to FIG. 1, FIG. 5, and FIG. 6.

FIG. 5 is a transverse sectional view as seen in a direction indicated by the arrows of the line A-A in FIG. 1. FIG. 6 is an exploded perspective view of the planetary-gear speed reduction mechanism 18.

The planetary-gear speed reduction mechanism 18 comprises a ring gear 55, a sun gear 56, a plurality of planetary gears 57, a planetary gear carrier 58 (see FIG. 1), and planetary gear holders 59 (see FIG. 1). The ring gear 55 comprises a plurality of protrusions 55a projecting in the axial direction. Engagement recessed portions 17f as many as the protrusions 55a are formed in the accommodating recessed portion 17a of the speed reduction gear case 17 (see FIG. 1). Through assembly of the protrusions 55a of the ring gear 55 to the engagement recessed portions 17f of the speed reduction gear case 17 while the protrusions 55a and the engagement recessed portions 17f are in phase, the ring gear 55 is accommodated in the speed reduction gear case 17 while the rotation of the ring gear 55 is stopped.

The sun gear 56 is arranged at the center of the ring gear 55. The output shaft 10a of the driving motor 10 is press-fitted to the sun gear 56. Moreover, the respective planetary gears 57 are arranged between the ring gear 55 and the sun gear 56 so as to mesh with the ring gear 55 and the sun gear 56. The respective planetary gears 57 are rotatably supported by the planetary gear carrier 58 and the planetary gear holders 59. The planetary gear carrier 58 comprises a cylindrical portion 58a at its center portion. The cylindrical portion 58a is press-fitted between an outer peripheral surface of the gear boss 32 and an inner peripheral surface of the rolling bearing 33 (see FIG. 1). An annular collar 75 is mounted between an inner peripheral surface of the another rolling bearing 34 and the outer peripheral surface of the gear boss 32.

In the planetary-gear speed reduction mechanism 18 having the configuration described above, when the driving motor 10 performs the rotational drive, the sun gear 56 coupled to the output shaft 10a of the driving motor 10 rotates, and, along with this rotation, the respective planetary gears 57 revolve along the ring gear 55 while rotating. Then, the planetary gear carrier 58 is rotated by the revolving motion of the planetary gears 57. With this, the rotation of the driving motor 10 is reduced in speed and transmitted to the drive gear 30, and a rotation torque increases. When the driving force is transmitted through the planetary-gear speed reduction mechanism 18 in such a manner, a high output of the ball screw shaft 24 can be obtained, and downsizing of the driving motor 10 can be attained.

Figure 7:
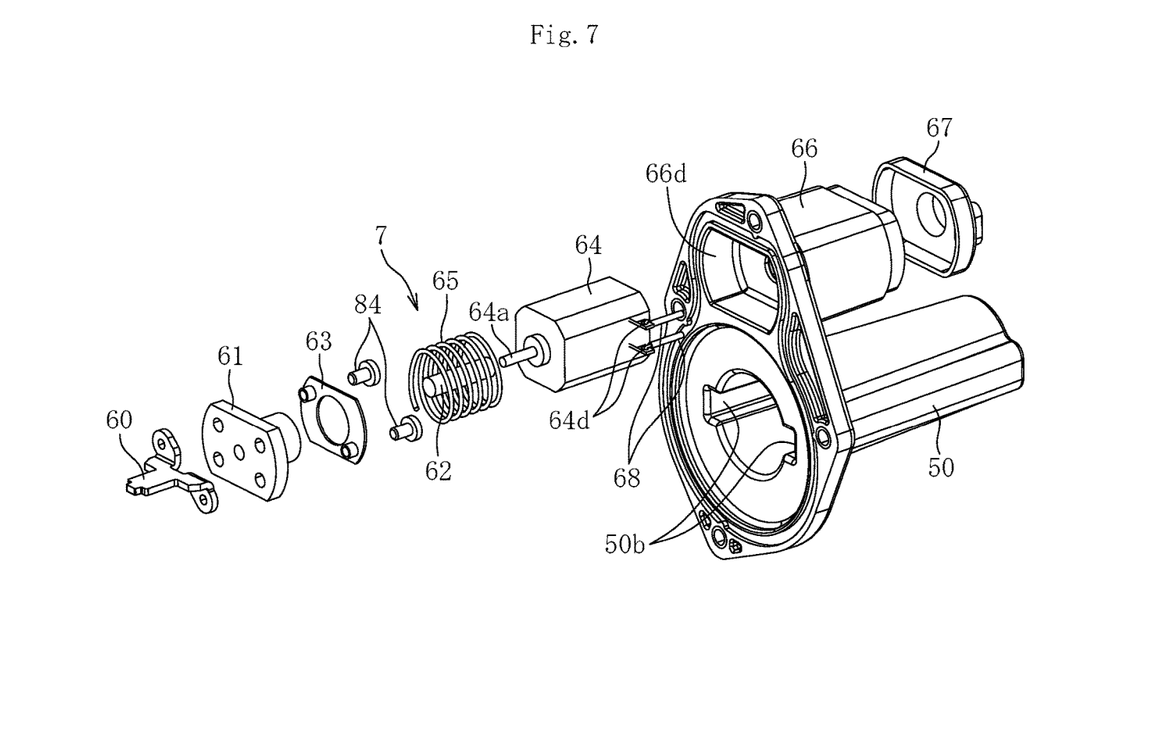
FIG. 7 is an exploded perspective view of a shaft case and a lock mechanism part mounted thereto.
Figure 8:
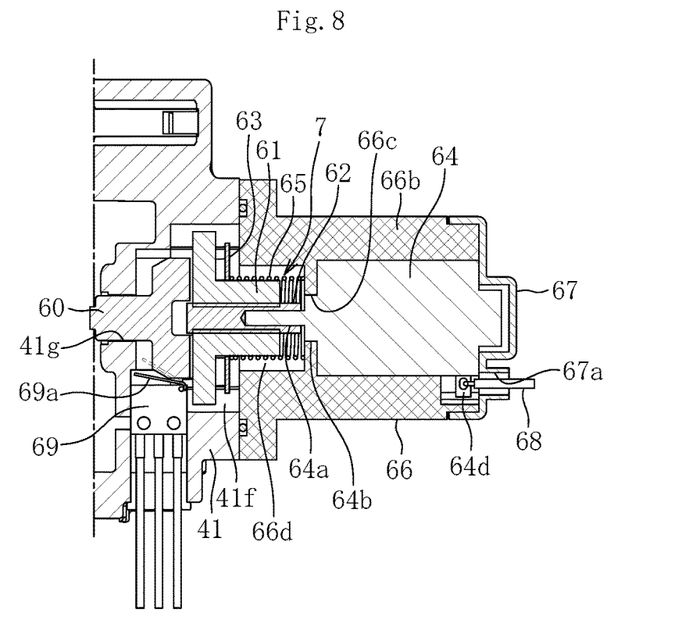
FIG. 8 is a transverse sectional view as seen in a direction indicated by the arrows of the line B-B in FIG. 1.

Next, description is made of the lock mechanism part 7 with reference to FIG. 1, FIG. 7, and FIG. 8. FIG. 7 is an exploded perspective view of the shaft case 50 and the lock mechanism part 7 mounted thereto. FIG. 8 is a transverse sectional view as seen in a direction indicated by the arrows of the line B-B in FIG. 1.

The lock mechanism part 7 mainly comprises a lock member 60, a sliding screw nut 61, a sliding screw shaft 62, a lock-member fixation plate 63, a locking motor (DC motor) 64, and a spring 65. When the lock mechanism part 7 is to be assembled, first, the lock member 60 is fastened to the sliding screw nut 61 through intermediation of the lock-member fixation plate 63 with bolts 84 (see FIG. 7). Next, the locking motor 64 is accommodated in a holder portion 66 formed in the shaft case 50. The sliding screw shaft 62 is then mounted to an output shaft 64a of the locking motor 64 projecting from the holder portion 66. Then, the spring 65 is arranged on an outer periphery of the sliding screw shaft 62, and the sliding screw nut 61 having the lock member 60 mounted thereto is mounted to the sliding screw shaft 62 through thread engagement. In such a manner, the assembly of the lock mechanism part 7 is completed.

The holder portion 66 is formed into a bottomed tubular shape, and a cap 67 is mounted on an opposite side of a bottom portion 66a thereof. The locking motor 64 is held in abutment against the bottom portion 66a of the holder portion 66 and an inner surface of the cap 67 under a state in which the locking motor 64 is inserted into the holder portion 66 and the cap 67 is mounted. Moreover, under this state, a projection 64b of the locking motor 64 on an output side (left side in FIG. 1) is fitted to a fitting hole 66c formed in the bottom portion 66a of the holder portion 66. Both of an outer peripheral surface of the main body of the locking motor 64 and an inner peripheral surface of a peripheral wall portion 66b of the holder portion 66 are formed into the same shapes, which are not cylindrical. Thus, the rotation of the locking motor 64 is restricted through the insertion of the locking motor 64 into the peripheral wall portion 66b of the holder portion 66. Through accommodation of the locking motor 64 in the holder portion 66 in such a manner, the locking motor 64 is held by the holder portion 66, and the entire lock mechanism part 7 is held. Moreover, the cap 67 has a hole portion 67a configured to insert cables 68 connected to motor terminals 64d of the locking motor 64 (see FIG. 8).

Lock-mechanism accommodating recessed portions 66d and 41f are respectively formed in a portion of the shaft case 50 at which the holder portion 66 is formed and a portion of the bearing case 41 opposed thereto. A through hole 41g is formed in the lock-mechanism accommodating recessed portion 41f on the bearing case 41 side. As illustrated in FIG. 1, a part of the output shaft 64a of the locking motor 64, the sliding screw shaft 62, the sliding screw nut 61, the lock-member fixation plate 63, the spring 65, and the lock member 60, which project from the holder portion 66, are accommodated in the lock-mechanism accommodating recessed portions 66d and 41f, and a distal end portion side of the lock member 60 is inserted into the through hole 41g under a state in which the shaft case 50 is mounted to the bearing case 41. Moreover, the spring 65 is compressed in the axial direction between the bottom portion 66a of the holder portion 66 and the lock-member fixation plate 63 under the state in which the shaft case 50 is mounted to the bearing case 41. The lock member 60 is always urged in an advancing direction (left side in FIG. 1) by the compressed spring 65.

Figure 9:
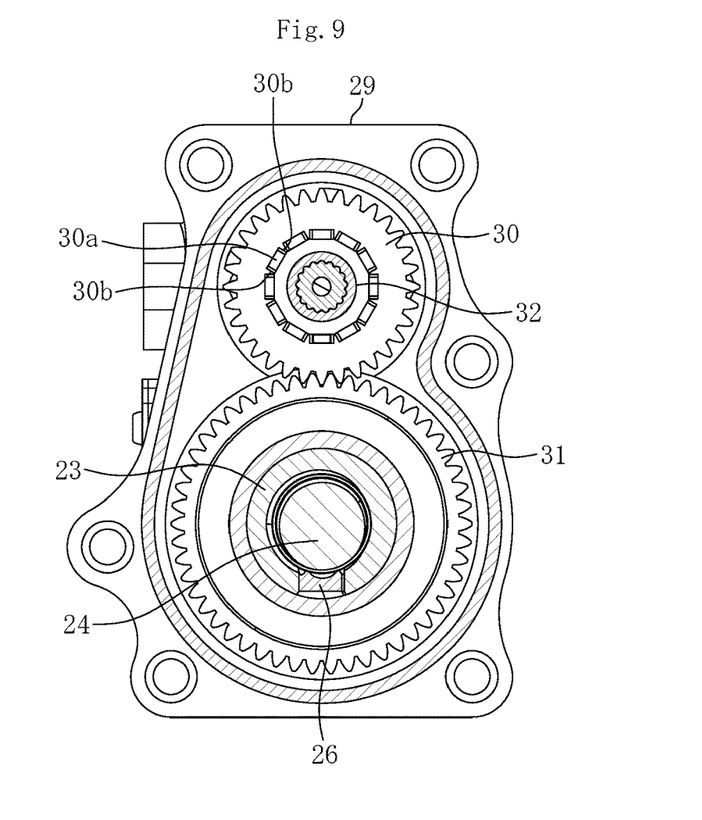
FIG. 9 is a transverse sectional view as seen in a direction indicated by the arrows of the line C-C in FIG. 1.

The drive gear 30 is arranged in the advancing direction of the lock member 60. The drive gear 30 has engagement holes 30a with which the distal end portion of the lock member 60 can be engaged. As illustrated in FIG. 9, which is a transverse sectional view as seen in a direction indicated by the arrows of the line C-C in FIG. 1, the plurality of engagement holes 30a are formed in a circumferential direction of the drive gear 30. The rotation of the drive gear 30 is restricted through the engagement of the lock member 60 with any one of those engagement holes 30a. Moreover, a tilted surface 30b is formed at an entrance portion of each of the engagement holes 30a, and the lock member 60 is thus smoothly inserted into the engagement hole 30a along the tilted surface 30b.

A lock sensor 69 configured to detect a locking state is mounted to the bearing case 41 (see FIG. 8). The lock sensor 69 comprises a contact element 69a formed of an elastic member such as a plate spring. When the lock member 60 advances to be engaged with the engagement hole 30a (brought into a locking state), the lock member 60 pushes the contact element 69a so that the lock sensor 69 detects the locking state.

Now, description is made of an operation of the lock mechanism part 7.

When power is not supplied to the locking motor 64, the lock member 60 is held at the advanced position by the spring 65, and is in the locking state in which the distal end portion of the lock member 60 is engaged with the engagement hole 30a of the drive gear 30. When the power is supplied to the driving motor 10 in order to start the driving of the ball screw shaft 24 in this state, the power is also supplied to the locking motor 64, and the locking motor 64 drives the lock member 60 in a retreating direction. With this, the sliding screw shaft 62 rotates. Meanwhile, the rotation of the sliding screw nut 61 is restricted through the insertion of the flat-plate-shaped distal end portion of the lock member 60 into the through hole 41g. Thus, when the sliding screw shaft 62 rotates, the sliding screw nut 61 retreats against the urging force of the spring 65, and the lock member 60 retreats integrally with the sliding screw nut 61. With this, the distal end portion of the lock member 60 is disengaged from the engagement hole 30a of the drive gear 30, and the locking state is thus released. In this way, while the ball screw shaft 24 is being driven, the lock member 60 is held at the retreated position, and the drive gear 30 is thus held in the unlocked state.

After that, when the supply of power to the driving motor 10 is shut off and the drive of the ball screw shaft 24 is thus stopped, the supply of power to the locking motor 64 is also shut off. With this, the driving force for causing the lock member 60 to retreat is no longer generated, and the lock member 60 is thus pushed to move in the advancing direction by the spring 65. Then, the locking state is brought about through the engagement of the distal end portion of the lock member 60 with the engagement hole 30a of the drive gear 30, thereby restricting the rotation of the drive gear 30.

Through restriction of the rotation of the drive gear 30 by the lock member 60 in such a manner, the ball screw shaft 24 is held in the state in which the ball screw shaft 24 does not retreat. With this, even when an external force is input from the object device to be operated to the ball screw shaft 24 side, a position of the ball screw shaft 24 can be held at a predetermined position. This configuration is particularly preferred for a case in which the electric actuator is applied to an application that requires holding a position of the ball screw shaft 24.

In this embodiment, the lock member 60 is caused to retreat by driving the locking motor 64. Conversely, the locking motor 64 may be driven to cause the lock member 60 to advance. Moreover, the lock member 60 may be caused to advance and retreat by rotating the locking motor 64 forward and backward.

A stroke sensor 70 configured to detect a stroke of the ball screw shaft 24 is mounted to the electric actuator 1 of this embodiment (see FIG. 2 and FIG. 3). The stroke sensor 70 is mounted to a sensor base 71. The sensor base 71 is fastened and fixed through bolts 72 to a sensor case 76 formed on an outer peripheral surface between the motor case 11 and the boot cover 39. Meanwhile, a permanent magnet 73 serving as a sensor target is mounted to an outer peripheral surface of a portion of the ball screw shaft 24 covered with the boot 36 (see FIG. 1). In this embodiment, the permanent magnet 73 is mounted to the ball screw shaft 24 through intermediation of a cylindrical elastic member 74 cut apart at a portion in a peripheral direction. When the ball screw shaft 24 advances and retreats, a position of the magnet 73 with respect to the stroke sensor 70 changes, and the position of the ball screw shaft 24 in the axial direction can be recognized through the stroke sensor 70 detecting a change in direction of line of magnetic force that changes along with the change in position of the magnet 73.

Figure 10:
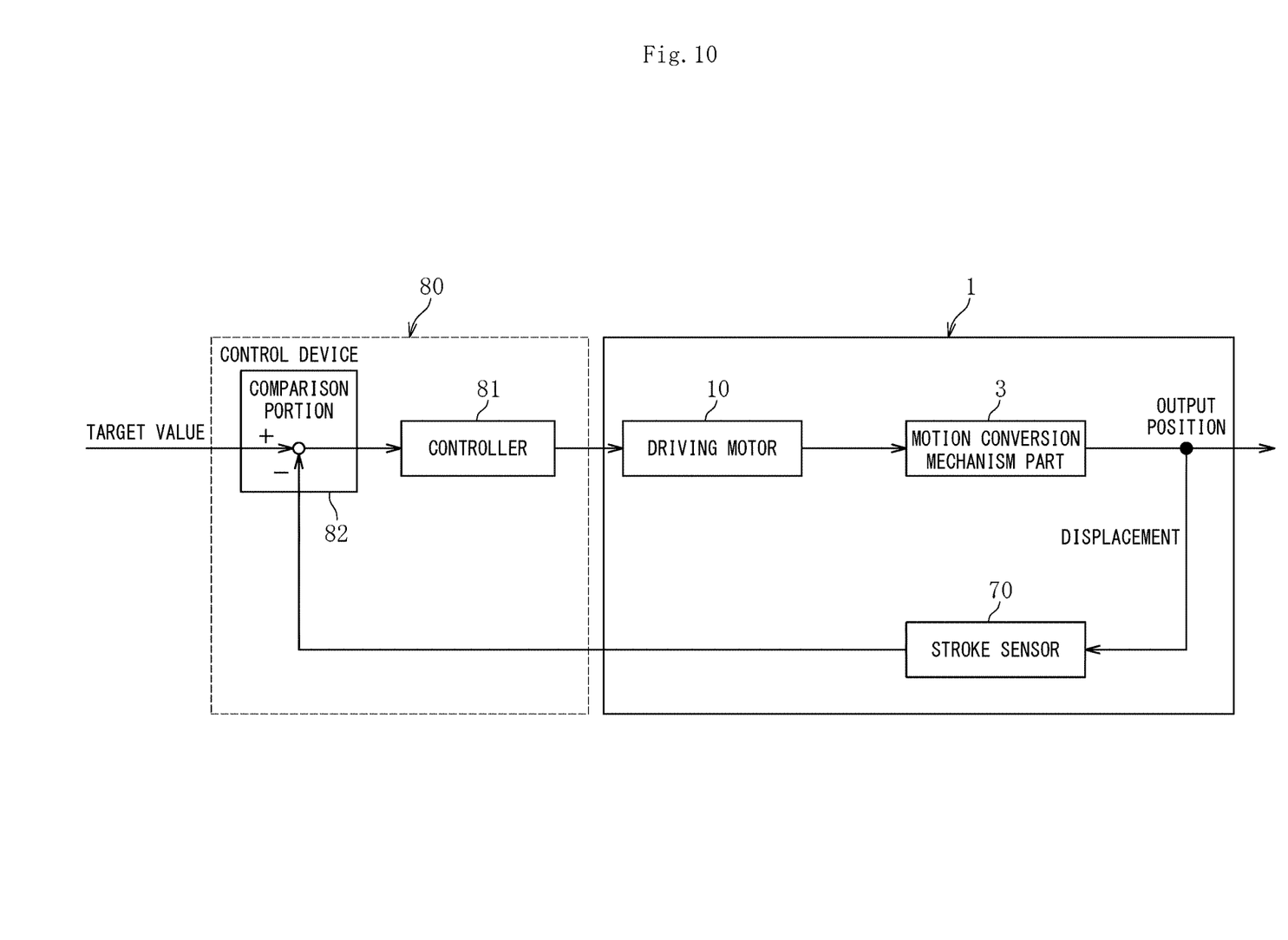
FIG. 10 is a control block diagram of the electric actuator.

Next, with reference to FIG. 10, description is made of feedback control using the stroke sensor 70.

As illustrated in FIG. 10, when a target value is transmitted to a control device 80, a control signal is transmitted from a controller 81 of the control device 80 to the driving motor 10. The target value is, for example, a stroke value calculated by an ECU provided at an upper position of a vehicle based on an operation amount when the operation amount is input to the ECU.

When the driving motor 10 receives the control signal, the driving motor 10 starts the rotational drive, and the driving force thereof is transmitted to the ball screw shaft 24 through intermediation of the planetary-gear speed reduction mechanism 18, the drive gear 30, the driven gear 31, and the ball screw nut 23, and the ball screw shaft 24 thus advances. With this, the object device to be operated arranged on the distal end portion side (actuator head side) of the ball screw shaft 24 is operated.

At this time, the stroke value (position in the axial direction) of the ball screw shaft 24 is detected by the stroke sensor 70. The detection value detected by the stroke sensor 70 is transmitted to a comparison portion 82 of the control device 80, and a difference between the detection value and the target value is calculated. Then, the driving motor 10 is driven until the detection value matches the target value. When the electric actuator 1 of this embodiment is applied to, for example, a shift-by-wire system, a shift position can reliably be controlled by feeding back the stroke value detected by the stroke sensor 70 to control the position of the ball screw shaft 24 in such a manner.

Figure 11:
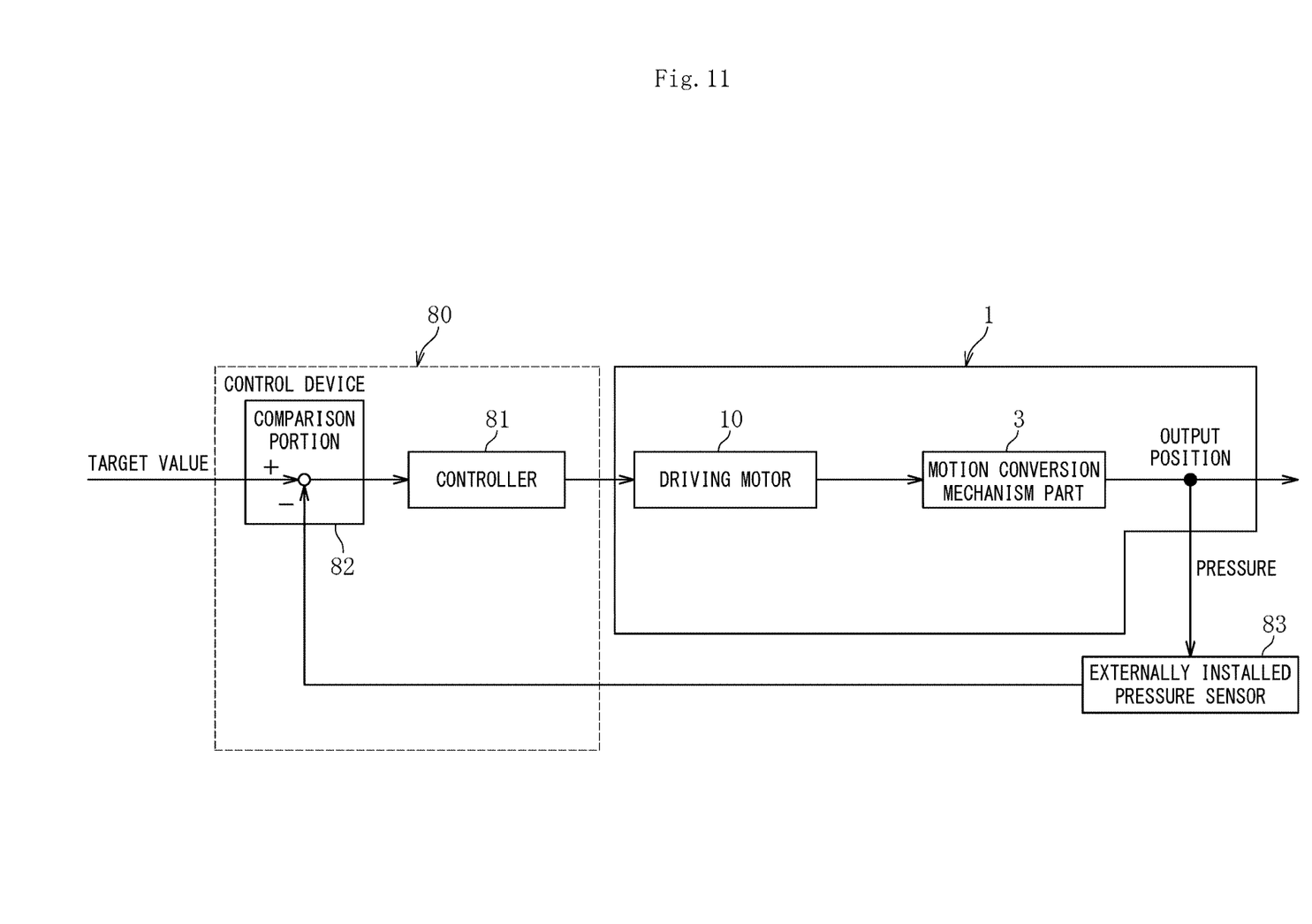
FIG. 11 is a control block diagram of the electric actuator.

Next, with reference to FIG. 11, description is made of feedback control in a case in which a pressure sensor 83 is used in place of the stroke sensor 70.

As illustrated in FIG. 11, in this case, the pressure sensor 83 is provided for the object device to be operated. When the operation amount is input to the ECU provided at the upper position of the vehicle, the ECU calculates a required target value (pressure command value). When the target value is transmitted to the control device 80, and the control signal is transmitted from the controller 81 to the driving motor 10, the driving motor 10 starts the rotational drive. With this, the ball screw shaft 24 advances, and the object device to be operated arranged on the distal end portion side (actuator head side) of the ball screw shaft 24 is operated to pressurize.

An operation pressure of the ball screw shaft 24 at this time is detected by the pressure sensor 83, and the position of the ball screw shaft 24 is subjected to the feedback control based on the detection value and the target value as in the case of the use of the stroke sensor 70. When the electric actuator 1 of this embodiment is applied to, for example, a brake-by-wire system, a hydraulic pressure of a brake can reliably be controlled by feeding back the pressure value detected by the pressure sensor 83 to control the position of the ball screw shaft 24 in such a manner.

The configuration and the operation of the electric actuator 1 of this embodiment are as described above. Now, description is made of components suitable for downsizing and increase in degree of freedom in design relating to the electric actuator 1 of this embodiment.

As illustrated in FIG. 1, in this embodiment, the support bearing 40 configured to support the ball screw 22 is arranged only on one side (right side) with respect to the driven gear 31, and any bearing configured to support the ball screw 22 is not arranged on an opposite side (left side). Through arrangement of the support bearing 40 only on the one side with respect to the driven gear 31 in such a manner, there is no need to consider interference between the support bearing 40 and other component parts on the side on which the support bearing 40 is not arranged. Accordingly, the degree of freedom in design of the component layout thus increases, and downsizing can also be attained.

Specifically, in this embodiment, through the arrangement of the support bearing 40 on an opposite side of the drive part 2 with respect to the driven gear 31, the drive part 2 can be arranged close to the ball screw 22 in a direction (radial direction) orthogonal to the axial direction thereof. Unlike this embodiment, when the support bearing 40 is arranged on the drive part 2 side, in order to prevent interference with the outer peripheral surface of the support bearing 40, the drive part 2 needs to be arranged at a position separated farther from the ball screw 22 in the radial direction than a position of a long dashed short dashed line a illustrated in FIG. 1. The long dashed short dashed line a is a line indicating a position closest to the drive part 2 side out of an imaginary plane of an extension in the axial direction of the outer peripheral surface of the support bearing 40 illustrated in FIG. 1, and is a position at which a portion of the outer peripheral surface of the support bearing 40 closest to the drive part 2 side is arranged when the support bearing 40 is arranged on the drive part 2 side.

In contrast, as in this embodiment, when the support bearing 40 is arranged on the opposite side of the drive part 2, the support bearing 40 is not present on the drive part 2 side. Therefore, an outer peripheral surface of the drive part 2 (motor case 11) on the ball screw 22 side can be arranged closer to the ball screw 22 than the position indicated by the long dashed short dashed line a in the radial direction. With this, the axis-to-axis distance between the driving motor 10 and the ball screw shaft 24 is reduced, and downsizing of the electric actuator 1 in the vertical direction can be attained. Moreover, the support bearing 40 is not arranged on the drive part 2 side. Thus, as in this embodiment, a space not used for the arrangement may be used to arrange the boot 36, the boot cover 39, the cylindrical portion 29g to which the boot 36 is mounted, the stroke sensor 70, the permanent magnet 73 serving as the target, and the like.

Moreover, in this embodiment, in order to achieve a stable cantilever configuration for the ball screw 22, the double-row angular contact ball bearing is used as the support bearing 40. Any of the balls 44 in the double rows are in contact with the raceway surfaces 42a of the outer ring 42 and the raceway surfaces 43a of the inner ring 43 at contact angles, and the double-row angular contact ball bearing can thus bear a radial load as well as axial loads in the both directions, and can stably and reliably support the ball screw 22 performing the linear motion. The contact angle is an angle formed between a plane (radial plane) perpendicular to a center axis of the bearing and a line of action (long dashed short dashed line passing through the center of each of the balls 44 illustrated in FIG. 1) of a resultant force of forces transmitted from the raceway surface to the ball. In particular, in this embodiment, there is provided a so-called back-to-back configuration in which the lines of actions of the respective balls 44 are arranged so as to cross each other on the radially outer side, which is also advantageous with respect to a moment load.

In the support bearing 40 of this embodiment, a preload does not act on the balls 44, and gaps between the respective raceway surfaces 42a and 43a of the outer ring 42 and the inner ring 43 and the balls 44 are positive gaps. Moreover, conversely, a preload may be applied to the balls 44, thereby forming negative gaps.

Figure 12:
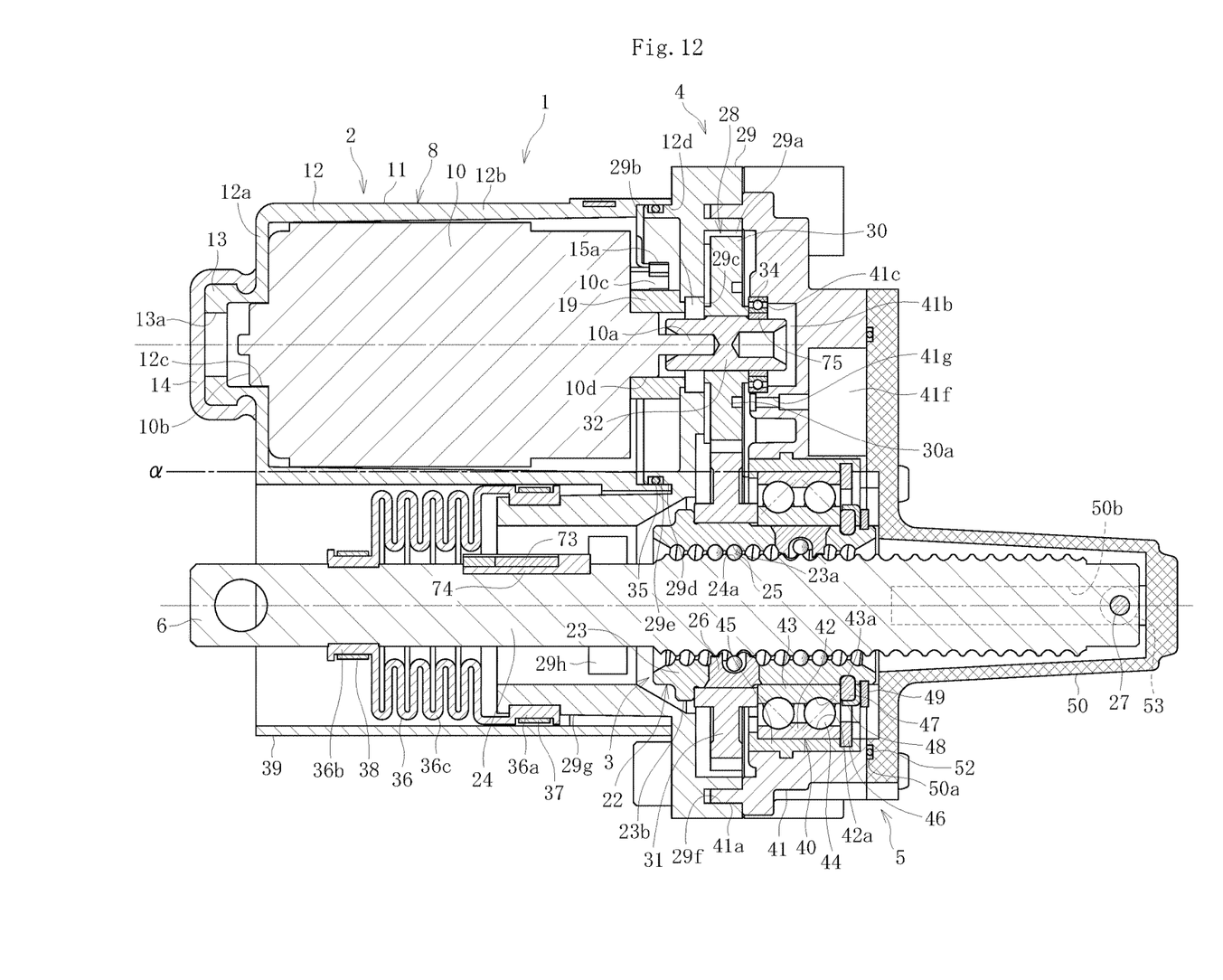
FIG. 12 is a vertical sectional view of the electric actuator according to another embodiment of the present invention.

FIG. 12 is an illustration of the electric actuator 1 according to another embodiment of the present invention.

The electric actuator 1 illustrated in FIG. 12 is configured, compared with the electric actuator 1 illustrated in FIG. 1, by eliminating the speed reduction mechanism part 9, directly coupling the motor part 8 and the driving force transmission part 4 to each other, and replacing the shaft case 50 by one without the holder portion 66 to which the lock mechanism part 7 is mounted. In this case, the speed reduction mechanism part 9 is not provided. Thus, the output shaft 10a of the driving motor 10 is press-fitted to the gear boss 32, and the rolling bearing 33 on the transmission gear case 29 side configured to support the gear boss 32 is omitted. Moreover, a member to be fitted to the motor adaptor 19, to which the driving motor 10 is mounted, is changed from the speed reduction gear case 17 to the transmission gear case 29, and is thus replaced by one having a different shape conforming to a fitting shape of the member to be fitted to the motor adaptor 19. The other configurations are the same as those of the embodiment illustrated in FIG. 1. The electric actuator 1 of the embodiment illustrated in FIG. 12 is controlled to operate basically in the same manner as in the embodiment illustrated in FIG. 1 except that the driving force from the driving motor 10 is directly transmitted to the driving force transmission part 4 without intermediation of the speed reduction mechanism part 9. Thus, description of the control and the operation is omitted.

Also in the electric actuator 1 illustrated in FIG. 12, as in the electric actuator 1 illustrated in FIG. 1, the support bearing 40 is arranged only on one side with respect to the driven gear 31. Therefore, the degree of freedom in design thus increases, and downsizing can be attained. Moreover, through use of a back-to-back double-row angular contact ball bearing as the support bearing 40, the ball screw 22 can stably and reliably be supported, and the configuration which is advantageous with respect to the moment load can be achieved.

As described above, according to one embodiment of the present invention, the size reduction and the increase in degree of freedom in design of the electric actuator can be achieved. Thus, the design of the electric actuator can be easily changed in accordance with various applications and usages. Thus, the configuration of the electric actuator according to one embodiment of the present invention is preferred for series production and multiple-type deployment of the electric actuator adapted to applications and usages such as an electric parking brake mechanism for vehicles including two-wheeled vehicles, an electric/hydraulic brake mechanism, an electric shift change mechanism, and an electric power steering as well as a 2WD/4WD electric switching mechanism and an electric shift change mechanism for an outboard engine (for a vessel propulsion engine).

In the above-mentioned embodiment, description is made of the example employing the double-low angular contact ball bearing as the support bearing 40. However, the support bearing 40 is not limited to this type of bearing, and a pair of single-row angular contact ball bearings may be used in combination. Moreover, as the support bearing 40, in addition to the angular contact ball bearing, another double-row bearing using, for example, a deep groove ball bearing may be applied. Even in the case in which such a double-row bearing is used, the increase in degree of freedom in design and downsizing can be attained thorough the support of the ball screw 22 by the double-row bearing on the one side with respect to the driven gear 31 as in the case described above. Moreover, the support bearing 40 may be formed so that the outer ring 42 is formed integrally with the bearing case 41, or the inner ring 43 is formed integrally with the ball screw nut 23.

The motion conversion mechanism part 3 is not limited to the ball screw 22, and may be a sliding screw device. However, the ball screw 22 is more preferred in terms of reducing the rotation torque and downsizing the driving motor 10.

The speed reduction mechanism part 9 may be a speed reduction mechanism other than the planetary-gear speed reduction mechanism 18. Moreover, the rotational drive may be transmitted at a constant speed or transmitted at a reduced speed between the drive gear 30 and the driven gear 31.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

REFERENCE SIGNS LIST 1 electric actuator
2 drive part
3 motion conversion mechanism part
4 driving force transmission part 5 motion-conversion-mechanism support part
6 operation part
7 lock mechanism part
8 motor part
9 speed reduction mechanism part
10 driving motor
10a output shaft
28 transmission gear mechanism
36 boot
40 support bearing
70 stroke sensor

The invention claimed is:

1. An electric actuator, comprising:
a drive part;
a motion conversion mechanism part configured to convert a rotary motion from the drive part to a linear motion in an axial direction parallel with an output shaft of the drive part;
a driving force transmission part comprising a transmission gear mechanism configured to transmit a driving force from the drive part to the motion conversion mechanism part;
a motion-conversion-mechanism support part comprising a double-row bearing configured to support the motion conversion mechanism part;
a bellows boot configured to expand and contract with the linear motion of the motion conversion mechanism and prevent a foreign substance from entering the motion conversion mechanism part;
a boot cover having a cylindrical shape, and being arranged around the bellows boot;
a stroke sensor configured to detect a stroke of the motion-conversion-mechanism part; and
a sensor case configured to accommodate the stroke sensor;
wherein the double-row bearing is arranged only at a side of the transmission gear mechanism that is opposite to a side of the transmission gear mechanism at which the drive part is arranged,
wherein the drive part comprises a driving motor and a cylindrical motor case configured to accommodate the driving motor,
wherein the boot cover is provided on the cylindrical motor case,
wherein the boot cover is arranged at a side of the transmission gear mechanism that is opposite to a side of the transmission gear mechanism at which the double-row bearing is arranged,
wherein the stroke sensor and the sensor case are arranged at the side of the transmission gear mechanism that is opposite to the side of the transmission gear mechanism at which the double-row bearing is arranged, and
wherein the sensor case is provided at a position where an outer peripheral surface of the cylindrical motor case and an outer peripheral surface of the boot cover are joined.

2. The electric actuator according to claim 1, wherein the double-row bearing comprises a double-row angular contact ball bearing.

3. The electric actuator according to claim 2, wherein the double-row angular contact ball bearing has a back-to-back configuration.

4. The electric actuator according to claim 1,
wherein the outer peripheral surface of the cylindrical motor case at a position closest to the motion conversion mechanism part is closer to the motion conversion mechanism part than an imaginary plane extending in the axial direction from an outer peripheral surface of the double-row bearing.

5. The electric actuator according to claim 1, wherein the motion conversion mechanism part is not supported by any bearing at the side of the transmission gear mechanism at which the drive part is arranged.

* * * * *